US011795250B2

(12) United States Patent
O'Brien et al.

(10) Patent No.: US 11,795,250 B2
(45) Date of Patent: Oct. 24, 2023

(54) STYRENE-FREE COPOLYMERS AND COATING COMPOSITIONS CONTAINING SUCH COPOLYMERS

(71) Applicant: SWIMC LLC, Cleveland, OH (US)

(72) Inventors: Robert M. O'Brien, Monongahela, PA (US); Mark Stuetelberg, Hiawatha, KS (US); Sebastien Gibanel, Givry (FR)

(73) Assignee: SWIMC, Cleveland, OH (US)

( * ) Notice: Subject to any disclaimer, the term of this patent is extended or adjusted under 35 U.S.C. 154(b) by 0 days.

(21) Appl. No.: 17/720,928

(22) Filed: Apr. 14, 2022

(65) Prior Publication Data

US 2022/0325021 A1 Oct. 13, 2022

Related U.S. Application Data

(63) Continuation of application No. 17/097,568, filed on Nov. 13, 2020, now Pat. No. 11,306,168, which is a continuation of application No. 16/705,421, filed on Dec. 6, 2019, now Pat. No. 10,836,915, which is a continuation of application No. 16/160,579, filed on Oct. 15, 2018, now Pat. No. 10,501,639, which is a continuation of application No. PCT/US2017/027453, filed on Apr. 13, 2017.

(60) Provisional application No. 62/323,314, filed on Apr. 15, 2016.

(51) Int. Cl.
| | |
|---|---|
| *B05D 7/22* | (2006.01) |
| *C08F 2/50* | (2006.01) |
| *C08G 61/04* | (2006.01) |
| *C08F 220/18* | (2006.01) |
| *C08F 2/22* | (2006.01) |
| *C09D 133/10* | (2006.01) |
| *C09D 133/12* | (2006.01) |
| *C09D 201/02* | (2006.01) |
| *B65D 25/14* | (2006.01) |
| *C09D 4/06* | (2006.01) |
| *C08F 220/14* | (2006.01) |

(52) U.S. Cl.
CPC ........ *C08F 220/1802* (2020.02); *B65D 25/14* (2013.01); *C08F 2/22* (2013.01); *C09D 4/06* (2013.01); *C09D 133/10* (2013.01); *C09D 133/12* (2013.01); *C09D 201/02* (2013.01); *B05D 7/227* (2013.01); *B05D 2202/25* (2013.01); *C08F 220/14* (2013.01); *C08F 220/1804* (2020.02)

(58) Field of Classification Search
CPC .. C09D 133/12; C09D 133/10; C09D 201/02; C09D 4/06; C09D 151/08; C08F 220/1802; C08F 220/1804; C08F 220/14; C08F 220/06; C08F 2/22; C08F 283/06; B65D 25/14; B05D 2202/25

USPC ...................................... 427/239, 230; 520/1
See application file for complete search history.

(56) References Cited

U.S. PATENT DOCUMENTS

| | | |
|---|---|---|
| 3,943,187 A | 3/1976 | Wu |
| 4,071,463 A | 1/1978 | Steinhauer |
| 4,076,676 A | 2/1978 | Sommerfeld |
| 4,212,781 A | 7/1980 | Evans et al. |
| 4,247,439 A | 1/1981 | Matthews et al. |
| 4,285,847 A | 8/1981 | Ting |
| 4,289,674 A | 9/1981 | Christenson et al. |
| 4,305,859 A | 12/1981 | McEwan et al. |
| 4,413,015 A | 11/1983 | Anderson et al. |
| 4,443,568 A | 4/1984 | Woo |
| 4,446,258 A | 5/1984 | Chu et al. |
| 4,476,262 A | 10/1984 | Chu et al. |
| 4,487,859 A | 12/1984 | Martino |
| 4,499,212 A | 2/1985 | Martino |
| 4,503,173 A | 3/1985 | Martino et al. |
| 4,517,322 A | 5/1985 | Birkmeyer et al. |
| 4,522,961 A | 6/1985 | Martino et al. |
| 4,522,962 A | 6/1985 | Abbey et al. |
| 4,948,834 A | 8/1990 | Baker et al. |
| 4,963,602 A | 10/1990 | Patel |
| 5,043,380 A | 8/1991 | Cole |
| 5,157,078 A | 10/1992 | Woo et al. |
| 5,201,436 A | 4/1993 | Owens et al. |

(Continued)

FOREIGN PATENT DOCUMENTS

| | | |
|---|---|---|
| EP | 0256391 A2 | 2/1988 |
| EP | 0101307 B1 | 5/1989 |

(Continued)

OTHER PUBLICATIONS

"New Reactive Surfactant ADEKA REASOAP ER/SR Series", Surface Active Agents, Technical Information, ADEKA Amazing Chemicals, ADEKA Corporation, 8 pages (2011).

(Continued)

*Primary Examiner* — Jessica Whiteley
(74) *Attorney, Agent, or Firm* — Patterson Thuente, P.A.

(57) ABSTRACT

An aqueous coating composition is provided that is preferably substantially free of styrene and structural units derived from styrene. The coating composition includes a resin system that preferably includes a water-dispersible polymer and an emulsion polymerized ethylenically unsaturated monomer component. The resin system is preferably formed using a process that includes emulsion polymerizing the ethylenically unsaturated monomer component in the presence of an aqueous dispersion including the water-dispersible polymer. In certain preferred embodiments, the water-dispersible polymer is a salt of an acid- or anhydride-functional aromatic polyether polymer.

27 Claims, No Drawings

(56) References Cited

U.S. PATENT DOCUMENTS

| | | | |
|---|---|---|---|
| 5,264,469 | A | 11/1993 | Mysliwczyk et al. |
| 5,296,525 | A | 3/1994 | Spencer |
| 5,387,625 | A | 2/1995 | Parekh et al. |
| 5,527,840 | A | 6/1996 | Chutko et al. |
| 5,532,297 | A | 7/1996 | Woo et al. |
| 5,714,539 | A | 2/1998 | Perez et al. |
| 5,830,952 | A | 11/1998 | Pedersen et al. |
| 5,869,552 | A | 2/1999 | Pedersen et al. |
| 5,877,239 | A | 3/1999 | Craun et al. |
| 5,922,817 | A | 7/1999 | Pedersen et al. |
| 6,008,273 | A | 12/1999 | Leibelt et al. |
| 6,710,113 | B2 | 3/2004 | Weitzel |
| 6,992,121 | B1 | 1/2006 | Peters et al. |
| 7,037,584 | B2 | 5/2006 | Wind et al. |
| 7,189,787 | B2 | 3/2007 | O'Brien et al. |
| 7,592,047 | B2 | 9/2009 | O'Brien et al. |
| 7,682,699 | B2 | 3/2010 | Wind et al. |
| 7,695,770 | B2 | 4/2010 | Dombrowski |
| 8,057,893 | B2 | 11/2011 | Killilea et al. |
| 8,092,876 | B2 | 1/2012 | O'Brien et al. |
| 8,105,744 | B2 | 1/2012 | Matsumura |
| 8,142,868 | B2 | 3/2012 | O'Brien et al. |
| 8,173,265 | B2 | 5/2012 | O'Brien et al. |
| 8,202,578 | B2 | 6/2012 | Killilea et al. |
| 8,617,663 | B2 | 12/2013 | O'Brien et al. |
| 8,835,012 | B2 | 9/2014 | O'Brien et al. |
| 8,907,005 | B2 | 12/2014 | Dombrowski et al. |
| 8,932,718 | B2 | 1/2015 | Garner et al. |
| 9,012,027 | B2 | 4/2015 | Nabuurs et al. |
| 9,029,470 | B2 | 5/2015 | Rademacher et al. |
| 9,181,448 | B2 | 11/2015 | Li et al. |
| 9,242,763 | B2 | 1/2016 | O'Brien et al. |
| 9,394,456 | B2 | 7/2016 | Rademacher et al. |
| 9,404,006 | B2 | 8/2016 | Li |
| 9,409,219 | B2 | 8/2016 | Niederst et al. |
| 9,415,900 | B2 | 8/2016 | O'Brien et al. |
| 9,540,484 | B2 | 1/2017 | Craun et al. |
| 9,605,177 | B2 | 3/2017 | Tang et al. |
| 9,862,854 | B2 | 1/2018 | O'Brien et al. |
| 10,306,168 | B2 * | 5/2019 | Ohmaru ............ H01L 27/14663 |
| 10,501,639 | B2 * | 12/2019 | O'Brien ................ C09D 133/12 |
| 10,836,915 | B2 * | 11/2020 | O'Brien ................ C08F 283/06 |
| 2002/0155235 | A1 | 10/2002 | Taylor et al. |
| 2003/0059618 | A1 | 3/2003 | Takai |
| 2003/0170396 | A1 | 9/2003 | Yokoi et al. |
| 2004/0236005 | A1 | 11/2004 | Scheerder et al. |
| 2005/0196629 | A1 | 9/2005 | Bariatinsky et al. |
| 2006/0100366 | A1 * | 5/2006 | O'Brien ................ C08F 265/02 |
| | | | 524/800 |
| 2010/0068433 | A1 | 3/2010 | Gibanel et al. |
| 2012/0302690 | A1 | 11/2012 | Cunningham et al. |
| 2013/0206756 | A1 | 8/2013 | Niederst et al. |
| 2013/0281574 | A1 | 10/2013 | Li et al. |
| 2013/0316109 | A1 | 11/2013 | Niederst et al. |
| 2014/0322465 | A1 | 10/2014 | Kaleem et al. |
| 2015/0004420 | A1 | 1/2015 | Hill et al. |
| 2015/0021323 | A1 | 1/2015 | Niederst et al. |
| 2015/0038635 | A1 * | 2/2015 | Martinez-Castro ...... C09D 7/45 |
| | | | 524/518 |
| 2015/0197597 | A1 | 7/2015 | Gallucci et al. |
| 2015/0197657 | A1 | 7/2015 | Niederst et al. |
| 2016/0009941 | A1 | 1/2016 | Rademacher |
| 2016/0017171 | A1 | 1/2016 | Li et al. |
| 2016/0024325 | A1 | 1/2016 | Li |
| 2016/0107818 | A1 | 4/2016 | Kaleem et al. |
| 2016/0122581 | A1 | 5/2016 | You et al. |
| 2016/0297994 | A1 | 10/2016 | Kuo et al. |
| 2016/0376446 | A1 | 12/2016 | Gibanel et al. |
| 2017/0002227 | A1 | 1/2017 | Gibanel et al. |
| 2017/0369603 | A1 | 12/2017 | Gibanel et al. |
| 2020/0109293 | A1 | 4/2020 | O'Brien et al. |
| 2020/0385601 | A1 | 10/2020 | Gibanel et al. |

FOREIGN PATENT DOCUMENTS

| | | |
|---|---|---|
| GB | 1555868 A | 11/1979 |
| GB | 1574721 A | 9/1980 |
| JP | S5339387 A | 4/1978 |
| JP | S62-223211 A | 10/1987 |
| JP | S63-020311 A | 1/1988 |
| JP | H0543830 A | 2/1993 |
| JP | H05-132647 A | 5/1993 |
| JP | H08-231925 A | 9/1996 |
| JP | 2002155234 A | 5/2002 |
| WO | WO 2002/064691 A2 | 8/2002 |
| WO | WO 2005/121595 A2 | 12/2005 |
| WO | WO 2010/097353 A1 | 9/2010 |
| WO | WO 2011/009024 A1 | 1/2011 |
| WO | WO 2012/089747 A1 | 7/2012 |
| WO | WO 2012/170623 A2 | 12/2012 |
| WO | WO 2013/191825 A1 | 12/2013 |
| WO | WO 2014/025411 A1 | 2/2014 |
| WO | WO 2014/089410 A1 | 6/2014 |
| WO | WO 2014/134442 A1 | 9/2014 |
| WO | WO 2014/139971 A1 | 9/2014 |
| WO | WO 2014/139973 A1 | 9/2014 |
| WO | WO 2014/186285 A1 | 11/2014 |
| WO | WO 2015/002958 A1 | 1/2015 |
| WO | WO 2015/057932 A1 | 4/2015 |
| WO | WO 2015/160788 A1 | 10/2015 |
| WO | WO 2015/164703 A1 | 10/2015 |
| WO | WO 2015/179064 A1 | 11/2015 |
| WO | WO 2016/105504 A1 | 6/2016 |
| WO | WO 2016/196174 A1 | 12/2016 |
| WO | WO 2016/196190 A1 | 12/2016 |
| WO | WO 2016/201407 A1 | 12/2016 |
| WO | WO 2017/079437 A1 | 5/2017 |
| WO | WO 2017/112837 A1 | 6/2017 |
| WO | WO 2017/180895 A1 | 10/2017 |
| WO | WO 2018/013766 A1 | 1/2018 |

OTHER PUBLICATIONS

Extended European Search Report for EP Application No. EP 17783149.2, dated Nov. 29, 2019, 7 pages.

Office Action for Japanese Patent Application No. 2018-553140 dated Feb. 12, 2021, 6 pages.

Surfactants Products List, Surface Active Agents, ADEKA Amazing Chemicals, ADEKA Corporation, 16 pages (2013).

* cited by examiner

STYRENE-FREE COPOLYMERS AND COATING COMPOSITIONS CONTAINING SUCH COPOLYMERS

CROSS REFERENCE TO RELATED APPLICATIONS

This application is a continuation under 35 U.S.C. § 111 of application Ser. No. 17/097,568 filed Nov. 13, 2020, which is a continuation under 35 U.S.C. § 111 of application Ser. No. 16/705,421 filed Dec. 6, 2019 and now U.S. Pat. No. 10,836,915 B2, which is a continuation under 35 U.S.C. § 111 of application Ser. No. 16/160,579 filed Oct. 15, 2018 and now U.S. Pat. No. 10,501,639 B2, which is a continuation under 35 U.S.C. § 111 of International Application No. PCT/US2017/027453 filed Apr. 13, 2017, which claims priority under 35 U.S.C. § 119 to and the benefit of U.S. Provisional Application No. 62/323,314 filed Apr. 15, 2016, each of which is entitled "STYRENE-FREE COPOLYMERS AND COATING COMPOSITIONS CONTAINING SUCH COPOLYMERS" and the disclosures of each of which are incorporated herein by reference in their entirety.

BACKGROUND OF THE INVENTION

Bisphenol A has been used to prepare polymers having a variety of properties and uses. For example, bisphenol A may be reacted with epichlorohydrin to provide polymers useful in packaging coatings. There is a desire to reduce or eliminate the use of certain bisphenol A-derived polymers in food or beverage container coatings. Although a number of replacement coating compositions made without bisphenol A have been proposed, some replacement compositions have exhibited insufficient coating properties such as insufficient corrosion resistance on metal substrates, insufficient flexibility or insufficient toughness.

In addition, in recent years styrene has also come under greater scrutiny. Although the balance of scientific evidence indicates that coatings containing polymerized styrene are safe for food-contact end uses, there is a desire by some to eliminate styrene from such end uses. Styrene, however, brings advantageous properties that contribute to the overall performance of food or beverage can coatings and can be difficult to replicate using other materials. As such, the use of styrene in conventional such coatings has been commonplace.

The balance of coating performance attributes required for a coating composition to be suitable for use as a food or beverage can coatings are particularly stringent and are unique from other coating end uses. As such, coatings designed for other ends uses are not typically suitable for use as food or beverage can coatings.

For example, coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salt, acids, sugars, fats, etc.) for extended periods of time (e.g., years). Food or beverage container coatings should also have good adhesion to the underlying substrate and remain sufficiently flexible after curing, because subsequent fabrication and denting during transportation, storage or use (e.g., by dropping) may cause the metal substrate to deform, which will cause the coating to flex. A brittle coating will crack during flexure, exposing the container metal to the packaged products, which can sometimes cause a leak in the container. Even a low probability of coating failure may cause a significant number of containers to leak, given the high number of food and beverage containers produced.

Accordingly, it will be appreciated that what is needed in the art are improved coating compositions that are made without intentionally using bisphenol A and/or styrene, but which exhibit the stringent balance of coating properties to permit the use of such coating compositions on food or beverage containers.

SUMMARY

In one aspect, the present invention provides an aqueous coating composition. In preferred embodiments, the coating composition is an aqueous food or beverage can coating composition suitable for use in forming a food-contact coating on a metal substrate of a food or beverage can. The coating composition preferably comprises an aqueous carrier and a resin system dispersed in the aqueous carrier. The resin system is preferably substantially free of styrene and comprises a water-dispersible polymer (e.g., a water-dispersible polyether polymer) and a polymerized ethylenically unsaturated monomer component, more preferably an emulsion polymerized ethylenically unsaturated monomer component. In preferred embodiments, the polymerized ethylenically unsaturated monomer component includes: (a) one or more alkyl (meth)acrylates (and more preferably at least 30 wt-% of one or more alkyl (meth)acrylates) and (b) one or more ethylenically unsaturated monomers having a cycloaliphatic group or a linear or branched hydrocarbon group including at least 4 carbon atoms (more preferably more than 30 wt-% of one or more ethylenically unsaturated monomers having a cycloaliphatic group or a linear or branched hydrocarbon group including at least 4 carbon atoms). Typically, the polymerized ethylenically unsaturated monomer component will include at least one methacrylate, and in some embodiments 50 wt-% or more of one or more methacrylates.

In yet another aspect, the present invention provides an aqueous food or beverage can coating composition that preferably comprises an aqueous carrier and a resin system dispersed in the aqueous carrier, wherein the resin system is preferably substantially free of styrene and comprises a water-dispersible polymer (e.g., a water-dispersible aromatic polyether polymer) and an emulsion polymerized ethylenically unsaturated monomer component that preferably comprises at least a majority (e.g., >50 wt-%, >60 wt-%, >70 wt-%, etc.), and more preferably at least 80 wt-%, of one or more (e.g., one, two, three, four, or five) of methyl methacrylate, ethyl acrylate, ethyl methacrylate, butyl acrylate (e.g., n-butyl acrylate), and butyl methacrylate (e.g., n-butyl methacrylate).

In yet another aspect, the present invention provides an aqueous food or beverage can that preferably comprises an aqueous carrier and a resin system dispersed in the aqueous carrier, wherein the resin system is substantially free of styrene and comprises: (i) a water-dispersible aromatic polyether polymer that is substantially free of each of bisphenol A, bisphenol F, and bisphenol S, including epoxides thereof and (ii) an emulsion polymerized ethylenically unsaturated monomer component, which is preferably emulsion polymerized in the presence of the water-dispersible aromatic polyether polymer. The emulsion polymerized ethylenically unsaturated monomer component preferably comprises at least 50 wt-% of one or more alkyl or cycloaliphatic (meth)acrylates and more than 30 wt-% of one or more ethylenically unsaturated monomers having a linear or branched hydrocarbon group that includes at least four carbon atoms and has a chain length of at least 3 carbon atoms. In preferred such embodiments, the total combined weight of the water-dispersible aromatic polyether polymer and the emulsion polymerized ethylenically unsaturated monomer component is at least 50 wt-% of the total resin solids present in the coating composition.

In yet another aspect, substrates (e.g., metal substrates) having a coating composition of the present invention disposed thereon are also disclosed. In some embodiments, the substrate is a metal food or beverage can, or portion thereof (e.g., twist-off closure lid, can end, beverage can end, can sidewall and bottom end, etc.) with the coating composition of the present invention applied on an exterior surface, an interior surface, or a combination of both. Certain embodiments of the present invention have been found to be particularly suitable for spray application on the interior of food or beverage cans, including, e.g., aluminum beverage cans.

In yet another aspect, the present invention provides a method of coating a food or beverage can. The method preferably includes applying a coating composition described herein to a surface of a metal substrate prior to or after forming the metal substrate into a food or beverage can or a portion thereof.

In yet another aspect, the present invention provides latex dispersions and methods of making latex dispersions. The latex dispersion is preferably substantially free of each of: styrene, bisphenol A, bisphenol F, and bisphenol S, including epoxides thereof, and is also optionally substantially free of substituted styrene compounds. In preferred embodiments, the method includes providing an aqueous dispersion of a water-dispersible polymer, emulsion polymerizing an ethylenically unsaturated monomer component in the presence of the aqueous dispersion of the water-dispersible polymer. In preferred embodiments, the ethylenically unsaturated monomer component comprises a mixture of monomers that includes more than 30% by weight of one or more ethylenically unsaturated monomer having a cycloaliphatic group or a four carbon or longer hydrocarbon group, and optionally a C1-C3 alkyl (meth)acrylate. The ethylenically unsaturated monomer component preferably includes at least one alkyl (meth)acrylate, more preferably at least one alkyl methacrylate. Alkyl (meth)acrylates preferably constitute at least 20 wt-%, at least 30 wt-%, at least 50 wt-%, at least 70 wt-%, at least 95 wt-%, or even 99 wt-% or more of the ethylenically unsaturated monomer component.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as limiting or as an exclusive list.

The details of one or more embodiments of the invention are set forth in the description below. Other features, objects, and advantages of the invention will be apparent from the description and from the claims.

Selected Definitions

Unless otherwise specified, the following terms as used herein have the meanings as provided below.

The term "mobile" when used with respect to a compound in a coating composition means that the compound can be extracted from the coating composition when a coating (typically ~1 mg/cm$^2$) is exposed to a test medium for some defined set of conditions, depending on the end use. Examples of these testing conditions include exposure of the cured coating to HPLC-grade acetonitrile for 24 hours at 25° C. Exemplary procedures and limits are set out in European Union Commission Directives 82/711/EEC, 93/8/EEC and 97/48/EC and in 21 CFR section 175.300, paragraphs (d) and (e).

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

A group that may be the same or different is referred to as being "independently" something. The term "group" also encompasses single atom moieties. Thus, for example, a halogen atom can be a group.

The terms "acrylate" and "acrylic" are used broadly herein and encompasses materials prepared from, for example, one or more of acrylic acid, methacrylic acid, or any acrylate or methacrylate compound. Thus, for example, a polyether-acrylate copolymer in which the "acrylate" component consists entirely of polymerized (meth)acrylic acid would still include an "acrylate" component even though no (meth)acrylate monomer was employed.

The term "(meth)" as used in "(meth)acrylate" and "(meth)acrylic acid" is intended to indicate that either a hydrogen or methyl group may be attached to the pertinent carbon atom of the monomer. For example "ethyl (meth)acrylate" encompasses both ethyl acrylate, ethyl methacrylate, and mixtures thereof.

The term "phenylene" as used herein refers to a six-carbon atom aryl ring (e.g., as in a benzene group) that can have any substituent groups (including, e.g., hydrogen atoms, hydrocarbon groups, oxygen atoms, hydroxyl groups, etc.). Thus, for example, the following aryl groups are each phenylene rings: —$C_6H_4$—, —$C_6H_3(CH_3)$—, and —$C_6H(CH_3)_2(OH)$—. In addition, for example, each of the aryl rings of a naphthalene group are phenylene rings.

The term "polyhydric phenol" (which includes dihydric phenols) as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "polyhydric polyphenol" (which includes bisphenols) refers to a polyhydric phenol that includes two or more aryl or heteroaryl groups each having at least one hydroxyl group attached to the aryl or heteroaryl ring.

The term "bisphenol" refers to a polyhydric polyphenol monomer having two phenylene groups that each have a hydroxyl group attached to a carbon atom of the ring, wherein the rings of the two phenylene groups do not share any atoms in common. The term "polyhydric monophenol" refers to a polyhydric phenol that (i) includes an aryl or heteroaryl group (more typically a phenylene group) having at least two hydroxyl groups attached to the aryl or heteroaryl ring and (ii) does not include any other aryl or heteroaryl rings having a hydroxyl group attached to the ring. The term "dihydric monophenol" refers to a polyhydric monophenol that only includes two hydroxyl groups attached to the aryl or heteroaryl ring.

The term "substantially free" when used with respect to a coating composition that may contain a particular mobile compound means that the coating composition contains less than 1,000 parts per million (ppm) of the recited mobile compound. The term "essentially free" when used with respect to a coating composition that may contain a particular mobile compound means that the coating composition contains less than 100 parts per million (ppm) of the recited mobile compound. The term "essentially completely free" when used with respect to a coating composition that may contain a particular mobile compound means that the coating composition contains less than 5 parts per million (ppm) of the recited mobile compound. The term "completely free" when used with respect to a coating composition that may contain a particular mobile compound means that the coating composition contains less than 20 parts per billion (ppb) of the recited mobile compound. If the aforementioned phrases are used without the term "mobile" (e.g., "substantially free of BPA compound") then the compositions contain less than the aforementioned amount of the compound whether the compound is mobile in the coating or bound to a constituent of the coating. When the phrases "free of" (outside the context of the aforementioned phrases), "does not include any" and the like are used herein, such phrases are not intended to preclude the presence of trace amounts of the pertinent structure or compound which may be present, e.g., as environmental contaminants.

The term "styrene-free" indicates that styrene was not intentionally used, although trace amounts of contaminating styrene may still be present. In the discussions that follow, for convenience, the phrase "styrene-free" may be replaced with "substantially free of styrene" to provide a discrete threshold value.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

As used herein, "a," "an," "the," "at least one," and "one or more" are used interchangeably. Thus, for example, a coating composition that comprises "a" polyether polymer can be interpreted to mean that the coating composition includes "one or more" polyether polymers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

Aqueous coating compositions for use on food or beverage containers such as, e.g., metal food or beverage cans have typically included at least some styrene-containing polymer. For example, both aqueous epoxy coating systems and latex coating systems for use in coating metal food or beverage cans have typically incorporated one or more free radical polymerized ethylenically unsaturated monomer components that include styrene (e.g., an "acrylic" polymer or component). The use of styrene in such coating compositions has been advantageous for a variety of reasons, including, for example, because styrene possesses both a high level of hydrophobicity and a relatively high glass transition temperature ("Tg") (e.g., styrene homopolymer exhibits a Tg of about 100° C.). Prior attempts to replace styrene in such aqueous food or beverage can coatings have resulted in coating systems that either exhibit an unsuitable balance of coating properties for a food or beverage container coating end use or that exhibit one or more coating properties that are substantially diminished relative to conventional styrene-containing systems.

The coating composition of the present invention is substantially free of styrene, and is preferably also substantially free of each of bisphenol A ("BPA"), bisphenol F ("BPF"), and bisphenol S ("BPS"), including epoxides thereof (e.g., the diglycidyl ether of BPA ("BADGE"), etc.). In preferred embodiments, the coating composition exhibits a balance of coating properties in food or beverage can coating end uses that is comparable to conventional epoxy-acrylate coating systems that utilize substantial amounts of both BPA and styrene. In certain preferred embodiments, the coating composition is also substantially free of substituted styrene compounds (e.g., alpha-methylstyrene, methyl styrenes (e.g., 2-methyl styrene, 4-methyl styrene, vinyl toluene, and the like), dimethyl styrenes (e.g., 2,4-dimethyl styrene), trans-beta-styrene, divinylbenzene, and the like). In some embodiments, the coating composition is substantially free of vinyl aromatic compounds.

The coating composition of the present invention is preferably an aqueous coating composition. In preferred embodiments, such aqueous coating compositions preferably include both: (i) a water-dispersible polymer (preferably a water-dispersible polyether polymer, more preferably a water-dispersible aromatic polyether polymer) and (ii) a polymerized ethylenically unsaturated monomer component. The above (i) and (ii) components are each preferably made using ingredients that do not include styrene (although trace amounts of unintentionally added styrene may potentially be present due to, e.g., environmental contamination, etc.), more preferably the coating composition as a whole is made using ingredients that do not include styrene. In preferred embodiments, the coating composition is a latex dispersion and the ethylenically unsaturated monomer component is emulsion polymerized in the presence of an aqueous dispersion that includes the water-dispersible polymer dispersed therein. The polymerized ethylenically unsaturated monomer component is typically a mixture of two or more different monomers that are preferably capable of free radical initiated polymerization in an aqueous medium. For sake of convenience, hereinafter the "polymerized ethylenically unsaturated monomer component" is referred to as the "emulsion polymerized ethylenically unsaturated monomer component."

In preferred embodiments, the emulsion polymerized ethylenically unsaturated monomer component includes one or more ethylenically unsaturated monomers that include a cycloaliphatic group or a hydrocarbon group including at least four carbon atoms (referred to collectively hereinafter as "monomer component A" or "monomers A" for short), or a mixture of both. Although any suitable ethylenically unsaturated monomer(s) A may be used, such monomers will typically be vinyl monomers such as, for example, alkyl (meth)acrylates, cycloalkyl (meth)acrylates, vinyl aromatics (including, e.g., aryl (meth)acrylates), vinyl esters, and the like. One or more heteroatoms may optionally be present in the cycloaliphatic group or the C4 or greater hydrocarbon group. In some embodiments, only carbon atoms and hydrogen atoms are present in the cycloaliphatic group or the C4 or greater hydrocarbon group. The C4 or greater hydrocarbon group can have any suitable structure, although linear chains or branched linear chains are preferred in some embodiments, with linear or branched linear groups having a longest chain that includes at least 3 carbon atoms being particularly preferred in certain embodiments. Alkyl (meth) acrylates having the specified groups are examples of preferred such monomers A, although any suitable type or types of ethylenically unsaturated monomers having such groups may be used.

While not intending to be bound by any theory, it is believed that the inclusion of one or more ethylenically unsaturated monomers that include a cycloaliphatic group and/or a hydrocarbon group having at least four carbon atoms can, among other things, help impart a suitably high level of hydrophobicity. It is believed that this may be desirable for multiple reasons such as, e.g., to enhance water resistance and/or retort resistance and help reduce partitioning of low concentration flavorants present in certain aqueous packaged products (e.g., certain colas) into the coating.

Examples of suitable C4 or greater hydrocarbon groups for inclusion in monomers A include hydrocarbon groups having 4 or more, 5 or more, 6 or more, 7 or more, or 8 or more carbon atoms, with preferred such hydrocarbon groups being butyl, pentyl, hexyl, and isomers thereof (e.g., n-butyl, sec-butyl, t-butyl. etc.). Some specific examples of such monomers A include: n-butyl (meth)acrylate, isobutyl (meth)acrylate, sec-butyl (meth)acrylate, tert-butyl (meth) acrylate, n-pentyl (meth)acrylate, isopentyl (meth)acrylate, hexyl (meth)acrylate, 2-ethylhexyl (meth)acrylate, isodecyl methacrylate, 3,5,5-trimethylhexyl (meth)acrylate, derivatives and isomers thereof, and combinations thereof. In some embodiments, C4 or greater hydrocarbon groups having between 4 and 6 carbon atoms are preferred. While not intending to be bound by any theory, it is believed that the inclusion of an excessive amount of monomers A having long linear carbon chains (e.g., C7 or greater, and in certain instances C5 and/or C6) may result in an emulsion polymerized ethylenically unsaturated monomer component having an unsuitably low glass transition temperature for certain internal can coating applications. Any suitably cycloaliphatic group may be employed in monomers A, including, for example, cycloaliphatic groups having 4-membered rings, 5-membered rings, 6-membered rings, or even 7-membered rings or larger. The cycloaliphatic groups may also be monocyclic or polycyclic (e.g., bicyclic, tricyclic, tetracyclic, etc.). Any suitable polycyclic groups may be employed, including, for example, bridged polycyclic ring systems (e.g., norbornane groups), fused polycyclic ring systems, or combinations thereof (e.g., tricyclodecane groups). Typically, the atoms making up the ring(s) will be carbon atoms, although as discussed above, one or more heteroatoms may also be present in the ring. Examples of monomers A having a cycloaliphatic group include cyclohexyl (meth)acrylate, 4-tert-butylcyclohexyl (meth)acrylate, 3,3,5-trimethylcyclohexyl (meth)acrylate, isobornyl (meth) acrylate, tetrahydrofurfuryl (meth)acrylate, variants and isomers thereof, and mixtures thereof.

In some embodiments, butyl (meth)acrylates are preferred monomers A. In some embodiments, the ethylenically unsaturated monomer component includes both butyl acrylate and butyl methacrylate. In some such embodiments, it may be preferable to use an excess amount of butyl methacrylate relative to the amount of butyl acrylate.

In some embodiments, at least one monomer A of the below Formula (I) is employed:

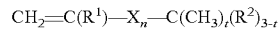

wherein:
R$^1$ is hydrogen or an alkyl group, more typically hydrogen or a methyl group;
n is 0 or 1, more typically 1;
X, if present, is a divalent linking group; more typically an amide, carbonate, ester, ether, urea, or urethane linkage; and even more typically an ester linkage of either directionality (i.e., —C(O)—O— or —O—C (O)—);
t is 0 to 3;
each R$^2$, if present, is independently an organic group that may optionally be itself branched, more typically an alkyl group that may optionally include one or more heteroatoms (e.g., N, O, P, Si, etc.); and
two or more R$^2$ may optionally form a cyclic group with one another.

In some embodiments, t is 1 and the total number of carbon atoms present in both R$^2$ groups is 6, 7, or 8. Examples of such monomers A include the VEOVA 9 (Tg 70° C.), VEOVA 10 (Tg −3° C.), and VEOVA 11 (Tg −40° C.) monomers commercially available from Hexion.

In some embodiments, t is 0, 1, or 2, and least one R$^2$ is a branched organic group, more typically a branched alkyl group. Thus, for example, in some embodiments, at least one R$^2$ is present that includes a tertiary or quaternary carbon atom. The VEOVA 9 monomer is an example of such a branched monomer.

In the discussions contained herein, various weight percentages are provided pertaining to the constituents of the emulsion polymerized ethylenically unsaturated monomer component. As will be understood by one of skill in the art, unless specifically indicated to the contrary, these weight percentages are based on the total weight of the monomers used to form the emulsion polymerized ethylenically unsaturated monomer component.

In preferred embodiments, the emulsion polymerized ethylenically unsaturated monomer component includes more than 30 weight percent ("wt-%"), preferably at least 35 wt-%, more preferably at least 40 wt-%, and even more preferably at least 45 wt-% of one or more monomers A. While not presently preferred, in some embodiments, it may be possible to use less than 30 wt-% of such monomers (e.g., at least 20 wt-% of monomers A) depending upon the balance of other monomers employed. Although the upper amount is not restricted, typically the ethylenically unsaturated monomer component will include less than 100 wt-%, more typically less than 80 wt-%, even more typically less than 75 wt-%, and even more typically less than 65 wt-% of one or more monomers A.

Any combination of one or more (meth)acrylates may be included in the ethylenically unsaturated monomer component. Suitable (meth)acrylates include any of those referenced herein, as well as those having the structure of the following Formula (II): CH$_2$=C(R$^3$)—CO—OR$^4$ wherein R$^3$ is hydrogen or methyl, and R$^4$ is an alkyl group preferably containing one to sixteen carbon atoms, a cycloaliphatic group, an aryl group, a silane group, or a combination thereof. If desired, $R^4$ may optionally be substituted with one or more (e.g., one to three) moieties such as hydroxy, halo, phenyl, and alkoxy, for example. Examples of suitable (meth)acrylates (including, e.g., suitable alkyl (meth)acrylates) include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, phenyl (meth)acrylate, lauryl (meth)acrylate, isobornyl (meth)acrylate, octyl (meth)acrylate, nonyl (meth)acrylate, hydroxyethyl (meth)acrylate, hydroxypropyl (meth)acrylate, and the like, substituted variants thereof (e.g., ring substituted variants of benzyl (meth)acrylate or phenyl (meth)acrylate), and isomers and mixtures thereof.

In certain preferred embodiments, with respect to any (meth)acrylates included in the emulsion polymerized ethylenically unsaturated monomer component, each $R^3$ is independently hydrogen or methyl and each $R^4$ is independently a cycloalkyl group or an alkyl group having two to eight carbon atoms. In some embodiments, each $R^3$ is independently hydrogen or methyl and each $R^4$ is independently an alkyl group having two to four carbon atoms.

Typically, (meth)acrylates (e.g., one or a mixture of two or more (meth)acrylates) will constitute a substantial portion of the emulsion polymerized ethylenically unsaturated monomer component. In some embodiments, (meth)acrylates may constitute at least 20 wt-%, at least 30 wt-%, at least 50 wt-%, at least 70 wt-%, at least 95 wt-%, or even 99 wt-% or more of the emulsion polymerized ethylenically unsaturated monomer component. The aforementioned weight percentages include all (meth)acrylates monomers present in the emulsion polymerized ethylenically unsaturated monomer component, regardless of whether one or more of the monomers may also qualify as a "monomer A". In some embodiments, one or more methacrylate monomers are present in the ethylenically unsaturated monomer component in an amount recited in this paragraph.

In some embodiments, alkyl (meth)acrylates may constitute at least 20 wt-%, at least 30 wt-%, at least 50 wt-%, at least 70 wt-%, at least 95 wt-%, or even 99 wt-% or more of the emulsion polymerized ethylenically unsaturated monomer. The aforementioned weight percentages include all alkyl (meth)acrylates monomers present in the emulsion polymerized ethylenically unsaturated monomer component, regardless of the fact that all such monomers are also (meth)acrylates, and regardless of whether one or more of the monomers may also qualify as a "monomer A".

In some embodiments, a majority (e.g., >50 wt-%, ≥60 wt-%, ≥70 wt-%, ≥80 wt-%, ≥90 wt-%, ≥95 wt-%, etc.), or even all, of the (meth)acrylates present in the emulsion polymerized ethylenically unsaturated monomer component are methacrylates, more preferably alkyl methacrylates. Examples of preferred methacrylates include methyl methacrylate, ethyl methacrylate, n-propyl methacrylate, n-butyl methacrylate, and isomers thereof (e.g., t-butyl methacrylate, iso-butyl methacrylate, etc.). In some embodiments, the emulsion polymerized ethylenically unsaturated monomer component includes both n-butyl methacrylate and ethyl methacrylate. In some such embodiments, the emulsion polymerized ethylenically unsaturated monomer component includes at least: (i) n-butyl methacrylate and ethyl methacrylate and (ii) one or more alkyl acrylates, more typically one or more "lower Tg" alkyl acrylate monomers (e.g., homopolymer Tg≤50° C., ≤40° C., ≤30° C., ≤20° C., ≤10° C., ≤0° C., ≤−10° C., or ≤−20° C.) such as ethyl acrylate (Tg −22° C. for its homopolymer), n-propyl acrylate (Tg −37° C. for its homopolymer), methyl acrylate (Tg 10° C. for its homopolymer), and/or n-butyl acrylate (Tg −54° C. for its homopolymer). Thus, in some embodiments, it may be desirable to include one or more ethylenically unsaturated monomers, such as one or more alkyl(meth)acrylates, more typically one or more alkyl acrylates, which have a homopolymer Tg of less than 0° C. (or less than any of the other Tg value's referenced above).

In some embodiments, the emulsion polymerized ethylenically unsaturated monomer component includes one or more ethylenically unsaturated monomers having a C1-C3 hydrocarbon group. The methyl group attached to the alpha-carbon of methacrylic acid is not considered such a C1-C3 hydrocarbon group. Similarly, the vinylic group of a vinyl monomer is not considered to be present in such a C1-C3 hydrocarbon group. Preferred such hydrocarbon groups include methyl, ethyl, propyl, and isopropyl groups. Examples of such monomers include alkyl (meth)acrylates in which the alkyl group (e.g., $R^4$ group in above Formula (II)) is a C1-C3 alkyl group such as, e.g., methyl, ethyl, n-propyl, iso-propyl, and mixtures thereof. Preferred such monomers having a C1-C3 hydrocarbon group include methyl methacrylate, ethyl acrylate, ethyl methacrylate, and mixtures thereof. The emulsion polymerized ethylenically unsaturated monomer component can include any suitable amount of such monomers, including, for example at least 10 wt-%, at least 20 wt-%, at least 30 wt-%, or at least 40 wt-%. Typically, the one or more ethylenically unsaturated monomers having a C1-C3 hydrocarbon group will constitute less than 70 wt-%, more typically less than 65 wt-%, and even more typically less than 60 wt-%. In some embodiments, the emulsion polymerized ethylenically unsaturated monomer component includes from about 45 to about 55 wt-% of ethylenically unsaturated monomers having a C1-C3 hydrocarbon group.

Difunctional (meth)acrylate monomers may be used in the emulsion polymerized ethylenically unsaturated monomer component as well. Examples include ethylene glycol di(meth)acrylate, 1,6-hexanediol di(meth)acrylate, allyl methacrylate, butanediol di(meth)acrylate, and the like.

In some embodiments, the emulsion polymerized ethylenically unsaturated monomer component may include a small amount (e.g., less than 5 wt-%, less than 2 wt-%, or less than 1 wt-%) of acid- or anhydride-functional ethylenically unsaturated monomer. Examples of suitable such acid- or anhydride-functional monomers may include any of those disclosed for use in conjunction with the acrylate portion of any of the polyether-acrylate copolymers disclosed herein.

The ethylenically unsaturated monomer component may also include any other suitable monomers. For example, suitable other vinyl monomers may include isoprene, diallylphthalate, conjugated butadiene, vinyl naphthalene, acrylonitrile, (meth)acrylamides (e.g., acrylamide, methacrylamide, N-isobutoxymethyl acrylamide, N-butoxymethyl acrylamide, etc.), methacrylonitrile, vinyl acetate, vinyl propionate, vinyl butyrate, vinyl stearate, and the like, and variants and mixtures thereof.

In some embodiments, the emulsion polymerized ethylenically unsaturated monomer component does not contain any oxirane-group containing monomer.

In presently preferred embodiments, the emulsion polymerized ethylenically unsaturated monomer component does not include any acrylamide-type monomers (e.g., acrylamides or methacrylamides).

The emulsion polymerized ethylenically unsaturated monomer component may optionally include one or more vinyl aromatic compounds other than styrene. Such vinyl aromatic compounds may be substituted styrene compounds and/or other types of vinyl aromatic compounds (e.g., any of the aryl-group-containing ethylenically unsaturated monomers described herein such as benzyl (meth)acrylate, etc.). In some embodiments, the emulsion polymerized ethylenically unsaturated monomer component includes, if any, less than 20 wt-%, less than 10 wt-%, less than 5 wt-% or less than 1 wt-% of vinyl aromatic compounds. In some embodiments, the emulsion polymerized ethylenically unsaturated monomer component is substantially free of such compounds.

In some embodiments, the emulsion polymerized ethylenically unsaturated monomer component includes an amount of methyl methacrylate, if any, of less than 10%, less than 20%, less than 40%, less than 50%, less than 60%, or less than 70% by weight, based on the total weight of the emulsion polymerized ethylenically unsaturated monomer component.

Examples of some preferred monomer mixtures for the emulsion polymerized ethylenically unsaturated monomer component are provided in the below table. It should be noted that there is some overlap in the monomer category descriptions. For example, butyl methacrylate is a monomer A, an alkyl (meth)acrylate, and a methacrylate. Moreover, monomer types not listed in the table (e.g., aryl acrylates, ethylenically unsaturated monomers that are neither a (meth) acrylate or a monomer A, etc.) may also be included in the monomer mixtures.

| Monomers included in ethylenically unsaturated monomer component | Embodiment I (wt-%) | Embodiment II (wt-%) | Embodiment III (wt-%) | Embodiment IV (wt-%) |
| --- | --- | --- | --- | --- |
| Monomers A | 30-100 | 35-80 | 40-75 | 45-65 |
| C1-C3 alkyl (meth)acrylates | 0-70 | 20-65 | 35-60 | 40-55 |
| Alkyl and/or cycloalkyl (meth)acrylates | 30-100 | 50-100 | 70-100 | 80-100 |
| Methacrylates | 20-100 | 50-100 | 60-100 | 70-100 |

The emulsion polymerized ethylenically unsaturated monomer component may exhibit any suitable Tg value. In some embodiments, such as interior can coatings that will be exposed to sensitive flavor products (e.g., certain colas in which certain flavorants are present at very low concentrations) and/or chemically aggressive food or beverage products (e.g., highly acidic, high salt, and/or high fat), it may be desirable to use an emulsion polymerized ethylenically unsaturated monomer component having a Tg of greater than about 0° C., preferably greater than about 20° C., even more preferably greater than about 30° C., and even more preferably greater than about 40° C. or greater than about 50° C. as determined by the Flory-Fox equation. In some embodiments, the emulsion polymerized ethylenically unsaturated monomer component may even have a Tg of greater than about 60° C. or greater than about 70° C. The Tg will typically be less than about 100° C., more typically less than about 90° C. as determined by the Flory-Fox equation. If the emulsion polymerized ethylenically unsaturated monomer component includes more than one stage, then the Flory-Fox equation should be applied to the total monomer pool used (as opposed, e.g., to considering each monomer stage independently). If the emulsion polymerized ethylenically unsaturated monomer component includes more than 5% by weight of one or more monomers not having a homopolymer Tg (e.g., because the monomer cannot be homopolymerized), then instead of relying on the Flory-Fox equation, a single-stage reference latex can be made using the same overall monomer composition as the emulsion polymerized ethylenically unsaturated monomer component and the actual Tg measured via DSC. If the emulsion polymerized ethylenically unsaturated amount includes 5% by weight or less of one or more monomers not having a homopolymer Tg, then the one or more such monomers can be ignored and the Tg determined by the Flory-Fox equation.

While it is contemplated that the ethylenically unsaturated monomer component may be polymerized separate from the water-dispersible polymer, in preferred embodiments, the ethylenically unsaturated monomer component is polymerized in an aqueous composition that includes the water-dispersible polymer dispersed therein. Preferably, the water-dispersible polymer functions as a "polymeric surfactant" that helps support emulsion polymerization of the ethylenically unsaturated monomer component. Thus, in some embodiments, the ethylenically unsaturated monomer component is polymerized in the presence of the water-dispersible polymer without the use of conventional non-polymeric surfactants (e.g., lower molecular weight surfactant such as amine-neutralized dodecyl benzene sulfonic acid or other such conventional surfactants).

The water-dispersible polymer can be any suitable polymer or combination of polymers including, for example, one or more acrylic polymers, polyester polymers, polyether polymers, polyolefin polymers, polysilicone polymers, polyurethane polymers, or copolymers thereof (e.g., polyether-acrylate copolymers, polyester-acrylate copolymers, etc.). The water-dispersible polymer may have any suitable water-dispersing group or groups. Typically, the water-dispersible polymer will include one or more salt groups (e.g., anionic salts groups such as base-neutralized acid or anhydride groups) and/or salt-forming groups (e.g., base groups and/or acid or anhydride groups). In preferred embodiments, the water-dispersible polymer is an acid- or anhydride-functional polymer in which preferably a suitable amount of the acid or anhydride groups have been neutralized with a suitable base, more preferably a fugitive base (e.g., nitrogen-containing bases such as ammonia or amines).

In some embodiments, the water-dispersible polymer includes a free-radical polymerized ethylenically unsaturated monomer component (e.g., a styrene-free vinyl addition component). In preferred such embodiments, the styrene-free vinyl addition component is formed from a styrene-free ethylenically unsaturated monomer mixture that includes one or more acid- or anhydride-functional monomers (e.g., methacrylic acid) and typically one or more (meth)acrylates, more typically one or more methacrylates, and even more typically one or more alkyl methacrylates (e.g., ethyl methacrylate and/or butyl methacrylate), optionally in combination with one or more acrylates and/or alkyl acrylates (e.g., ethyl acrylate), wherein the monomer mixture is polymerized in organic solvent in the presence or absence of the water-dispersible polymer. In some embodiments, the water-dispersible polymer is a polyether-acrylate copolymer, more preferably an aromatic polyether-acrylate that is free of any structural units derived from styrene. In such embodiments, a polyether polymer used to form the polyether-acrylate copolymer preferably comprises at least 30 wt-%, more preferably at least 50 wt-%, and even more preferably at least 60 wt-% or more of the polyether-acrylate copolymer, based on the total weight of the polyether-acrylate copolymer. Typically, the polyether polymer will constitute less than 95 wt-%, more typically less than 90 wt-%, and even more typically less than 85 wt-% of the polyether-acrylate copolymer.

In some embodiments, the water-dispersible polymer may be a phosphated polymer. Examples of such water-dispersible polymers include reaction products of polymers having oxirane groups, preferably aromatic polyether polymers having oxirane groups, and phosphoric acid or related compounds. A specific example of such a water-dispersible polymer is an aromatic polyether phosphate ester polymer. Such phosphated polymers may additionally include one or more other salt groups to enable desired molecular weight and water-dispersity properties to be achieved.

The water-dispersible polymer can have any suitable molecular weight. Typically, the number average molecular weight of the water-dispersible polymer will be between about 1,500 and about 50,000, more typically between about 2,000 and about 20,000.

In some embodiments, the polyether polymer has a Tg of at least 30° C., more preferably at least 60° C., and even more preferably at least 70° C. or at least 80° C. Typically, the Tg of the polyether polymer will be less than 150° C., more typically less than 130° C., and even more typically less than 110° C. In this context, the Tg refers to the Tg value of the polyether polymer alone (e.g., prior to forming a polyether-acrylate copolymer). Differential scanning calorimetry (DSC) is an example of a useful method for determining the Tg of the polyether polymer, with a representative DSC methodology provided later herein.

In embodiments in which the water-dispersible polymer is a polyether polymer or polyether-acrylate copolymer formed from ingredients including a polyether polymer, the polyether polymer will typically have a number average molecular weight (Mn) of at least 2,000, more typically at least 3,000, and even more typically at least 4,000. The molecular weight of the polyether polymer may be as high as is needed for the desired application. Typically, however, the Mn of the polyether polymer will not exceed about 11,000. In some embodiments, the polyether polymer has an Mn of about 5,000 to about 8,000. In embodiments where the water-dispersible polymer is a polyether-acrylate copolymer, the molecular weight of the overall polymer may be higher than that recited above, although the molecular weight of the polyether polymer portion will typically be as described above. Typically, however, such polyether-acrylate copolymers will have an Mn of less than about 20,000.

The water-dispersible polymers can include any suitable group or combination of groups capable of rendering the polymer stably dispersible in an aqueous carrier liquid. The polymer of the aqueous dispersion can be made water-dispersible by incorporating non-ionic water-dispersing groups, salt groups (e.g., anionic and/or cationic salt groups), or a combination thereof. As used herein, the term "water-dispersing groups" also encompasses water-solubilizing groups.

Salt groups are preferred water-dispersing groups. Examples of suitable salt groups include neutralized acid groups or neutralized base groups, with neutralized acid groups being presently preferred. Examples of neutralized acid groups include carboxylic acid or anhydride groups that have been at least partially neutralized with a suitable base. Fugitive bases are presently preferred, with nitrogen-containing bases being preferred, and amines (e.g., primary, secondary, and/or tertiary amines) being particularly preferred.

In certain embodiments, the amine is a tertiary amine. Preferably, the tertiary amine is selected from trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. In certain preferred embodiments, an acid- or anhydride-functional polymer is at least 25% neutralized with the amine in water.

A variety of acid- or anhydride-functional monomers, or salts thereof, can be incorporated into the water-dispersible polymer; their selection is dependent on the desired final polymer properties. In some embodiments, such monomers are ethylenically unsaturated, more preferably, alpha, beta-ethylenically unsaturated. Suitable ethylenically unsaturated acid- or anhydride-functional monomers for the present invention include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated acids (e.g., mono-protic or diprotic), anhydrides or monoesters of a dibasic acid, which are copolymerizable with the optional other monomer(s) used to prepare the polymer. Illustrative monobasic acids are those represented by the structure $CH_2=C(R^5)-COOH$, where $R^5$ is hydrogen or an alkyl group of 1 to 6 carbon atoms. Suitable dibasic acids include those represented by the formulas $R^6(COOH)C=C(COOH)R^7$ and $R^6(R^6)C=C(COOH)R^8COOH$, where $R^6$ and $R^7$ are each independently hydrogen, an alkyl group of 1 to 8 carbon atoms, a halogen, a cycloalkyl group of 3 to 7 carbon atoms or a phenyl group, and $R^8$ is an alkylene group of 1 to 6 carbon atoms. Half-esters of these acids with alkanols of 1 to 8 carbon atoms are also suitable.

Examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof.

Examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride.

If desired, aqueous salts of the above acids may also be employed.

The water-dispersible polymer may have any suitable acid number so long as the polymer is preferably capable of being stably dispersed into water. Preferred acid- or anhydride-functional water-dispersible polymers have an acid number of at least about 40, more preferably at least about 55, and even more preferably at least about 70 milligrams (mg) KOH per gram of the polymer. While the upper range of suitable acid numbers is not particularly restricted, typically the acid number will be less than about 400, more typically less than about 300, and even more typically less than about 200 mg KOH per gram of the polymer. Acid numbers referred to herein may be calculated pursuant to BS EN ISO 3682-1998 standard, or alternatively may be theoretically determined based on the reactant monomers.

Polyether polymers are preferred water-dispersible polymers, with aromatic polyethers, which are preferably substantially free of each of BPA, BPF, and BPS, including epoxides thereof, being particularly preferred. Such polyether polymers typically include secondary hydroxyl groups, more typically secondary hydroxyl groups present in backbone —$CH_2$—CH(OH)—$CH_2$— segments. In preferred embodiments, the polyether polymer is derived from ingredients including (i) an aliphatic, cycloaliphatic, and/or aromatic diepoxide and (ii) an extender compound capable of building the molecular weight of the diepoxide to form a polymer. The above (i) and (ii) may be reacted together in an appropriate ratio such as, e.g., about 1.1:1 to about 1:1.1 stoichiometric ratio.

Examples of suitable extender compounds include diols, diacids, and compounds having both an acid and a hydroxyl group. Dihydric phenols are preferred extenders, with polyhydric monophenols being preferred in certain embodiments. Examples of dihydric monophenol compounds include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquionine, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof.

Examples of suitable diepoxides include diepoxides of (e.g., diglycidyl ethers or esters of): substituted dihydric phenols (e.g., ortho-substituted dihydric phenols such as tetramethyl bisphenol F, di-tert-butylhydroquinone, and the like), aromatic diols (e.g., benzene dimethanol, vanillyl alcohol, furane dimethanol, and the like), aromatic diacids (e.g., isophthalic acid, terephthalic acid, and the like), aliphatic diols, aliphatic diacids, cycloaliphatic diols (e.g., cyclobutane diols such as 2,2,4,4-tetramethyl-1,3-cyclobutanediol), cycloaliphatic diacids (e.g., cyclobutane diacids such as 2,2,4,4-tetramethyl-1,3-cyclobutane dicarboxylic acid), and combinations thereof.

In some embodiments, the water-dispersible polymer is a reaction product of ingredients including a dihydric phenol and a diepoxide of a dihydric phenol (e.g., reacted in an appropriate ratio such as, e.g., about 1.1:1 to about 1:1.1 stoichiometric ratio).

Examples of suitable polyether polymers are disclosed in U.S. Pat. No. 9,409,219, US2013/0206756, US2015/0021323, WO2015/160788, WO2015/164703, WO2015/057932, and WO2015/179064.

Polymers that are not reducible in water can be rendered water-dispersible using technologies well known to those of skill in the art. In some embodiments, the polymer (e.g., aromatic polyether polymer or other polymer) is covalently attached to one or more materials (e.g., monomers, oligomers or polymers) having one or more water-dispersing groups (e.g., salt or salt-forming groups) to render the polymer water-dispersible. The salt, salt-forming, or the water-dispersible-group-containing material may be, for example, oligomers or polymers that are (i) formed in situ prior to, during, or after formation of the polymer or (ii) provided as preformed materials that are reacted with a preformed, or nascent, polymer. The covalent attachment may be achieved through any suitable means including, for example, via reactions involving carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions. In one embodiment, a linking compound is utilized to covalently attach the polymer and a salt- or salt-forming-group-containing material. In certain preferred embodiments, the one or more materials having salt or salt-forming groups is a vinyl addition component (e.g., a vinyl addition polymer), which is typically an acrylic material (e.g., is formed from an ethylenically unsaturated monomer component that includes one or more of a (meth)acrylate, a (meth)acrylic acid, and the like), more preferably an acid- or anhydride-functional acrylic material.

In one embodiment, a water-dispersible polymer may be formed from preformed polymers (e.g., (a) an oxirane-functional polymer, such as, e.g., an oxirane-functional polyether polymer, and (b) an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer.

In another embodiment, a water-dispersible polymer may be formed from an oxirane-functional polymer (more preferably a polyether polymer described herein) that is reacted with ethylenically unsaturated monomers to form an acid-functional polymer, which may then be neutralized, for example, with a base such as a tertiary amine. Thus, for example, in one embodiment, a water-dispersible polymer may be formed pursuant to the acrylic polymerization teachings of U.S. Pat. Nos. 4,285,847 and/or 4,212,781, which describe techniques for grafting acid-functional acrylic groups (e.g., via use of benzoyl peroxide) onto oxirane-functional polymers. In another embodiment, acrylic polymerization may be achieved through reaction of ethylenically unsaturated monomers with unsaturation present in the polymer. See, for example, U.S. Pat. No. 4,517,322 and/or U.S. Published Application No. 2005/0196629 for examples of such techniques.

In another embodiment, a water-dispersible polymer may be formed having the structure E-L-A, where "E" is a polyether portion of the polymer formed from a polyether polymer, "A" is a polymerized acrylic portion of the polymer, and "L" is a linking portion of the polymer which covalently links E to A. Such a polymer can be prepared, for example, from (a) a polyether polymer preferably having about two oxirane groups, (b) an unsaturated linking compound preferably having (i) a carbon-carbon double bond, a conjugated carbon-carbon double bonds or a carbon-carbon triple bond and (ii) a functional group capable of reacting with an oxirane group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically unsaturated carboxylic acid monomers). Such polymers may be formed, for example, using a BPA- and BADGE-free polyether polymers described in U.S. Pat. No. 9,409,219, US2013/0206756, US2015/0021323, WO2015/160788, WO2015/057932, or WO2015/179064 optionally in combination with the materials and techniques disclosed in U.S. Pat. No. 5,830,952 or US2010/0068433.

In the above approaches utilizing an acrylic component to render the polymer water-dispersible, the acrylic component is typically formed from an ethylenically unsaturated monomer mixture that includes one or more α,β-unsaturated carboxylic acid, although any suitable acid- or anhydride-functional monomer may be used. The one or more α,β-unsaturated carboxylic acid preferably renders the polymer water-dispersible after neutralization with a base. Suitable α,β-unsaturated carboxylic acid monomers include any of those previously referenced herein.

The water-dispersible polymer ("a") and the emulsion polymerized ethylenically unsaturated monomer component ("b") can be employed in any suitable weight ratio relative to one another. For example, the weight ratio of (a):(b) can range from 10:1 to 1:10. In preferred embodiments, the weight ratio (a):(b) is from 40:60 to 90:10, more preferably 50:50 to 80:20, and even more preferably 60:40 to 70:30.

With regard to the conditions of the emulsion polymerization, the ethylenically unsaturated monomer component is preferably polymerized in aqueous medium with a water-soluble free radical initiator in the presence of the water-dispersible polymer. Although not presently preferred, it is also contemplated that the emulsion polymerized ethylenically unsaturated monomer can be polymerized separately and then later mixed with the water-dispersible polymer.

The temperature of polymerization is typically from 0° C. to 100° C., preferably from 50° C. to 90° C., more preferably from 70° C. to 90° C., and even more preferably from 80° C. to 85° C. The pH of the aqueous medium is usually maintained at a pH of 5 to 12.

The free radical initiator can be selected, for example, from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed. In some embodiments, a mixture of benzoin and hydrogen peroxide is used.

Further examples of polymerization initiators which can be employed include polymerization initiators that thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also preferably includes a reducing component such as, e.g., ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof. The reducing component is frequently referred to as an accelerator or a catalyst activator.

The initiator and accelerator (if any) are preferably used in proportion from about 0.001% to 5% each, based on the weight of monomers to be copolymerized. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfite/sodium hydrosulfite/Fe(II).

Chain transfer agents can be used to control polymer molecular weight, if desired.

The polymerization reaction of the ethylenically unsaturated monomer component in the presence of the aqueous dispersion of the water-dispersible polymer may be conducted as a batch, intermittent, or continuous operation.

Typically, the reactor is charged with an appropriate amount of water and water-dispersible polymer. Typically, the reactor is then heated to the free radical initiation temperature and then charged with the ethylenically unsaturated monomer component. There may also be some water miscible solvent present. At temperature, the free radical initiator is added and is allowed to react for a period of time at polymerization temperature, the remaining ethylenically unsaturated monomer component (if any) is added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the latex recovered. It should be understood that the above methodology is only representative and other suitable processes may also be used.

In some embodiments, the emulsion polymerized ethylenically unsaturated monomer component has a Mn of at least about 100,000, at least about 200,000, or at least about 300,000. The upper range of the Mn of the emulsion polymerized ethylenically unsaturated monomer component is not restricted and may be 1,000,000 or more. In certain embodiments, however, the Mn of the emulsion polymerized ethylenically unsaturated component is less than about 1,000,000, or less than about 600,000.

As previously discussed, in preferred embodiments, the water-dispersible polymer and emulsion polymerized ethylenically unsaturated monomer component are both present in a latex (e.g., both present in a same latex particle and/or latex copolymer), which is preferably formed by emulsion polymerizing the ethylenically unsaturated monomer component in the presence of the water-dispersible polymer. The water-dispersible polymer and the emulsion polymerized ethylenically unsaturated monomer component may optionally be covalently attached to one another.

Coating compositions of the present invention preferably include at least a film-forming amount of the resin system described herein containing the water-dispersible polymer and the emulsion polymerized ethylenically unsaturated monomer component. In preferred embodiments, the coating composition includes at least about 50 wt-%, more preferably at least about 65 wt-%, and even more preferably at least about 80 wt-% of the resin system (which is preferably a latex resin system), based on the solids weight of the water-dispersible polymer and the emulsion polymerized ethylenically unsaturated monomer component relative to the total resin solids weight of the coating composition. The coating composition includes 100 wt-% or less, more typically less than about 99 wt-%, and even more typically less than about 95 wt-% of the resin system (which is preferably a latex resin system), based on the solids weight of the water-dispersible polymer and the emulsion polymerized ethylenically unsaturated monomer component relative to the total resin solids weight of the coating composition. In certain preferred embodiments in which the resin system is a latex-based resin system, the solids weight of the water-dispersible polymer and the emulsion polymerized ethylenically unsaturated monomer component is the solids weight of a latex that functions as the primary film former for the coating composition.

Typically, resin solids will constitute at least 30 wt-%, at least 40 wt-%, or at least 50 wt-% or more of the coating solids. In some embodiments, resin solids constitute all or substantially all (e.g., greater than 90 or 95 wt-%) of the coating solids.

The coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow-control agents, thixotropic agents, dispersing agents, antioxidants, adhesion promoters, light stabilizers, curing agents, co-resins and mixtures thereof. Each optional additive is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as a siloxane-based and/or polysilicone-based materials. Representative examples of suitable such materials are disclosed in International Publication Nos. WO/2014/089410 and WO/2014/186285.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of each of BPA, BPF, BPS, epoxides thereof (e.g., BADGE), and epoxy novolacs.

Any of the well-known, hydroxyl-reactive curing resins can be used. For example, phenoplast, blocked isocyanates, and aminoplast curing agents may be used, as well as combinations thereof. In addition, or alternatively, carboxyl-reactive curing resins may be used.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

Examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

Other suitable curing agents may include benzoxazine curing agents such as, for example, benzoxazine-based phenolic resins. Examples of benzoxazine-based curing agents are provided in US2016/0297994.

Alkanolamide-type curing agents may also be used. Preferred such curing agents include beta-hydroxyalkyl-amide crosslinkers such as, for example, those sold under the PRIMID tradename (e.g., the PRIMID XL-552 and QM-1260 products) by EMS-CHEMIE AG.

The concentration of the curing agent (e.g., crosslinker) in the coating composition may depend on the type of curing agent, the time and temperature of the bake, and the molecular weights of the copolymer particles. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition may be cured without the use of an external crosslinker (e.g., without phenolic crosslinkers). Additionally, the coating composition may be substantially free of formaldehyde and formaldehyde-containing materials, more preferably essentially free of these compounds, even more preferably essentially completely free of these compounds, and most preferably completely free of these compounds.

In preferred embodiments, the coating composition is also substantially free or completely free of any structural units derived from bisphenol A ("BPA"), bisphenol F ("BPF"), and bisphenol S ("BPS"), including epoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. In some embodiments, the coating composition is substantially free or completely free of any structural units derived from a bisphenol. By way of example, a structural unit derived from an epoxide of a bisphenol (e.g., a digylcidyl ether of a bisphenol) is considered to be a structural unit derived from a bisphenol.

Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. Publication No. 2013/0316109 for a discussion of such structural units and applicable test methods.

In preferred embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

If desired, the coating composition may also include one or more other optional polymers, such as, for example, one or more acrylic polymers, alkyd polymers, epoxy polymers, polyolefin polymers, polyurethane polymers, polysilicone polymers, polyester polymers, and copolymers and mixtures thereof.

The aqueous carrier of the coating composition includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 80%, more preferably less than about 65%, and even more preferably less than about 50% by weight of the aqueous carrier, based on the total weight of the aqueous carrier. In some embodiments, organic solvents constitute less than 40% by weight of the aqueous carrier.

The coating composition preferably has a viscosity suitable for a given coating application. In some embodiments, the coating composition may have an average viscosity greater than about 20 seconds, more preferably greater than 25 seconds, and even more preferably greater than about 30 seconds, based on the Viscosity Test described below (Ford Viscosity Cup #2 at 25° C.). In some embodiments, the coating composition may also have an average viscosity less than about 80 seconds, more preferably less than 60 seconds, and even more preferably less than about 50 seconds, based on the Viscosity Test described below (Ford Viscosity Cup #2 at 25° C.).

The coating composition of the present invention may be applied to a variety of different substrates using a variety of different coating techniques (e.g., spray coating, roll coating, wash coating, dipping, etc.). In preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

Preferred coating compositions of the present invention are particularly suitable for in forming spray-applied interior coating on aluminum or steel two-piece draw and ironed beverage or food cans.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating weight of from about 0.6 grams per square meter ("gsm") to about 13 gsm and more typically from about 1.0 gsm to about 6.5 gsm. Coating systems for use on closures (e.g., twist-off metal closures) for food or beverage containers may have an average total coating weight up to about 5.2 gsm. In certain embodiments in which the coating composition is used as an interior coating on a drum (e.g., a drum for use with food or beverage products), the total coating weight may be approximately 13 gsm.

The metal substrate used in forming rigid food or beverage cans, or portions thereof, typically has an average thickness in the range of about 125 micrometers to about 635 micrometers. Electro-tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans, or portions thereof, is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated (e.g., metal coil for forming beverage can ends), curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

In some embodiments, the coating composition is an inside spray coating composition capable of being spray applied on an interior of a food or beverage can (e.g., a 2-piece food or beverage can) to effectively, and evenly, coat the substrate and form a continuous cured coating (i.e., a coating that exhibits a suitably low initial metal exposure value, thereby indicating that the substrate has been effectively coated).

Preferred Tg for the cured coating include those greater than about 50° C., more preferably greater than about 60° C., even more preferably greater than about 70° C., and in some embodiments, greater than about 80° C. Preferred Tg for the cured coating include those less than about 120° C., more preferably less than about 115° C., even more preferably less than about 110° C., and in some embodiments, less than about 100° C. An example of a suitable DSC methodology is provided below.

To further prevent or otherwise reduce coating penetration by an intended food or beverage product, the cured coating is preferably suitably hydrophobic. For example, the cured coating can have a contact angle with deionized water greater than about 80, more preferably greater than about 85, and even more preferably greater than about 90, when tested under ambient conditions.

In some embodiments, the cured coating preferably exhibits desired properties for use as an interior food-contact coating (e.g., inside spray coating) for food and beverage containers. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below.

Flexibility is also important for inside spray coatings, as well as other food or beverage can coatings, so that the coating can deflect with the metal substrate during post-cure fabrication steps (e.g., necking and dome reformation) and if the can is dropped from a reasonable height during transport or use. In some preferred embodiments, the cured coating preferably exhibits a metal exposure less than about 10 mA, more preferably less than about 3.5 mA, even more preferably less than about 2.5 mA, and optimally less than about 1.5 mA, pursuant to the Metal Exposure After Drop Damage test below.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces. Polymers and coating compositions such as those described in the Examples may be evaluated using a variety of tests including:

1. Viscosity Test

This test measures the viscosity of a latex emulsion or coating composition for rheological purposes, such as for sprayability and other coating application properties. The test was performed pursuant to ASTM D1200-88 using a Ford Viscosity Cup #2 at 25° C. The results are measured in the units of seconds.

2. Curing Conditions

For beverage inside spray bakes, the curing conditions involve maintaining the temperature measured at the can dome at 180° C. to 225° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited were evaluated by tests as follows.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following minimum film weights are typically used: 0.6 grams per square meter (gsm), for a beer can, 1.0 gsm for a soda can, and 1.6 gsm for a can intended for use in packaging a "hard-to-hold" product.

The coated can is filled with this room-temperature conductive solution, and an electrical probe is attached in contact to the outside of the can (uncoated, electrically conducting). A second probe is immersed in the electrically conductive solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0 mA. Preferred coatings give metal exposure values of less than 3 mA, more preferred values of less than 2 mA, and even more preferred values of less than 1 mA. Commercially acceptable metal exposure values are typically less than 2 mA on average.

4. Metal Exposure after Drop Damage

Drop damage resistance measures the ability of the coated container to resist cracks after being in conditions simulating dropping of a filled can. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a cylindrical tube having a 2 and ⅞ inch (7.3 centimeter) internal diameter, can bottom down, onto an impact wedge (e.g., an inclined plane angled upwards at 33 degrees). The impact wedge is positioned relative to the tube such that a dent is formed in the rim area where the can bottom end meets the sidewall (typically referred to as the "chime" of a beverage can). The water-filled can is dropped through the tube from a 24-inch (61 centimeter) height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 10 mA, more preferred values of less than 3.5 mA, even more preferred values of less than 2.5 mA, and optimal values of less than 1.5 mA.

5. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

6. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

7. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, and/or Blush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid (C6H807) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

8. Pasteurization

The pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in either a deionized water bath for 45 minutes at 85° C., or a 3% solution of acetic acid ($C_2H_4O_2$) in deionized water for 30 minutes to 100° C. Coated panels are immersed in the heated solution for 30 minutes. The coated substrate is then removed from the bath and tested for coating adhesion and blush as described above. Commercially viable coatings preferably provide adequate pasteurization resistance with perfect adhesion (rating of 10) and blush ratings of 5 or more, optimally 9-10.

9. Glass Transition Temperature ("Tg")

Samples for differential scanning calorimetry ("DSC") testing may be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

10. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, and even more preferred results of less than 1 ppm. Most preferably, the global extraction results are optimally non-detectable.

EXAMPLES

The present disclosure is more particularly described in the following examples that are intended as illustrations only, since numerous modifications and variations within the scope of the present disclosure will be apparent to those skilled in the art. Unless otherwise indicated, all parts and percentages are by weight.

Example 1: BPA-Free and Styrene-Free Water-Dispersible Polyether-Acrylate Copolymer To a reaction vessel equipped with a stirrer, reflux condenser, thermocouple, heating and cooling capability, and inert gas blanket, 477.4 parts of the digylcidyl ether of tetramethyl bisphenol F and 114.2 parts hydroquinone were added. Then 0.59 parts ethyltriphenyl phosphonium iodide and 13.9 parts carbitol were added. The system was heated to 130° C. under an inert atmosphere. Once exothermic activity was observed and peaked, temperature was set to 165° C. for 75 minutes or until target epoxy value of 0.039 equivalents per 100 gram solid resin was achieved. At epoxy value, 156.8 parts 2-butoxyethanol was added slowly followed by 90.6 parts n-butanol and 65.9 parts amyl alcohol. The temperature was allowed to drift to a set point of 110° C. To the reaction vessel a premix of 117.4 parts methacrylic acid, 41.8 parts n-butyl methacrylate, 62.7 parts ethyl methacrylate, 31.2 parts ethyl acrylate, 6.4 parts azobisisobutyronitrile, and 6.4 parts tert-butyl peroctoate was added over 90 minutes to maintain the temperature under 115° C. Once addition was complete 66.4 parts 2-butoxyethanol and 1.7 parts tert-butyl peroctoate was added and the temperature was held at 110° C. for 50 minutes. At the end of the hold time, an additional 0.6 parts tert-butyl peroctoate was added and the temperature was held for 40 minutes. Once the hold time was complete, the reactor set point was set to 95° C., agitation was increased, and the temperature was allowed to drift from 110° C. to 95° C. while 89.4 parts of deionized water over 10 minutes. At temperature, 56.4 parts dimethyl ethanolamine was added over 5 minutes, followed by a 30 minute hold. For the dispersion step, 782.6 parts deionized water was added to the vessel over 50 minutes while heating was removed and the temperature was allowed to drift down. Following the water charge, a second charging of 1230.9 parts of deionized water was added over 30 minutes.

Example 2: BPA-Free and Styrene-Free Latex and Coating Composition

Immediately following completion of the above steps for Example 1, the resulting material of Example 1 was provided and the heat was reinitiated to a set point of 75° C., at temperature a premix of 148.1 parts n-butyl methacrylate, 185.2 parts ethyl methacrylate, and 37.0 parts n-butyl acrylate was added over 20 minutes. Once added, temperature was increased to a set point of 82° C. At temperature 2.9 parts benzoin, 2.9 parts hydrogen peroxide, and 4.6 parts deionized water were added and the temperature was held for 120 minutes. An additional 0.8 parts benzoin, 0.8 parts hydrogen peroxide, and 4.3 parts deionized water were added and the temperature was held for 60 minutes. The process yielded a material at 31.5% solids, a Brookfield viscosity of 2032 centipoise (cps), an acid number of 58.9, a pH of 6.7, and a particle size of 0.19 micron.

To produce a finish coating composition, 159.3 parts 2-butoxyethanol, 200.3 parts amyl alcohol, and 1.7 parts n-butanol were charged to the vessel. The process yielded a material of ~19.2% solids and a #2 Ford Cup viscosity of 39.0 seconds.

Comparative Example A: BPA-Free, Styrene-Containing Latex

To a reaction vessel equipped with a stirrer, reflux condenser, thermocouple, heating and cooling capability, and inert gas blanket, 499.5 parts of the digylcidyl ether of tetramethyl bisphenol F and 118.6 parts hydroquinone were added. Then 0.96 parts ethyltriphenyl phosphonium iodide and 40.1 parts 2-butoxyethanol were added. The system was heated to 130° C. under an inert atmosphere. Once exothermic activity was observed and peaked, temperature was set to 165° C. for 60 minutes or until target epoxy value of 0.039 equivalents per 100 gram solid resin was achieved. At epoxy value, 14.8 parts 2-hexoxyethanol was added slowly followed by 60.6 parts n-butanol. To the reaction vessel a pre-reacted solution acrylic composed of 68.2 parts acrylic acid, 43.9 parts methacrylic acid, 87.8 parts styrene, 50.0 parts ethyl acrylate, 19.1 parts deionized water, 26.1 parts n-butanol, 194.3 parts n-amyl alcohol, and 8.9 parts 2-hexoxyethanol was added over 60 minutes and the temperature maintained at 110° C. Once all pre-reacted solution acrylic was added, the solution was allowed to mix for a minimum of 20 minutes. Following a hold, 38.2 parts dimethyl ethanolamine was added over 3 to 5 minutes followed by a 60 minute hold. At the end of the hold, 18.2 parts dimethyl ethanolamine added and held for 15 minutes. For the dispersion step, 2,111.7 parts deionized water was added to the vessel over 90 minutes while the temperature was allowed to drift to 80° C. The heat was reinitiated to a set point of 80° C. At temperature, a premix of 147.6 parts styrene, 146.7 parts n-butyl acrylate, and 3.0 parts benzoin was added to the dispersion. Once added, the temperature was increased to a set point of 84° C. At temperature 3.0 parts hydrogen peroxide and 4.5 parts deionized water were added and the temperature was held for 120 minutes. Following hold, an additional 73.7 parts styrene, 0.7 parts benzoin, 0.7 parts hydrogen peroxide, and 4.3 parts deionized water were added and the temperature was held for 180 minutes. The process yielded a material of 32.7% solids, at Brookfield viscosity of 1068 cps, a pH of 6.7, and a particle size of 0.14 micron.

To prepare a finish coating composition, 159.3 parts 2-butoxyethanol, 200.3 parts amyl alcohol, and 1.7 parts n-butanol were charged to the vessel. The process yielded a material of 20.0% solids and #2 Ford Cup viscosity of 36 seconds.

Comparative Example B: BPA and Styrene-Containing Latex

A commercial BPA- and styrene-containing water-based beverage inside spray composition was provided. The composition was a latex-based coating composition in which the latex includes water-dispersible BPA- and styrene-containing aromatic polyether-acrylate copolymer over-polymerized (i.e., emulsion polymerized) with an ethylenically unsaturated monomer component including a substantial amount of styrene.

Example 3: BPA-Free and Styrene-Free Latex Including High Level of Methyl Methacrylate in Ethylenically Unsaturated Monomer Component To a reaction vessel equipped with a stirrer, reflux condenser, thermocouple, heating and cooling capability, and inert gas blanket, 125.6 parts of the digylcidyl ether of tetramethyl bisphenol F and 30.0 parts hydroquinone were added. Then 0.15 parts ethyltriphenyl phosphonium iodide and 3.7 parts carbitol were added. The system was heated to 130° C. under an inert atmosphere. Once exothermic activity was observed and peaked, the temperature was set to 165° C. for 75 minutes or until target epoxy value of 0.039 Equivalent per 100 gram solid resin was achieved. At epoxy value, 41.1 parts 2-butoxyethanol was added slowly followed by 34.5 parts n-butanol and 6.7 parts 2-hexoxyethanol. The temperature was allowed to drift to a set point of 110° C. To the reaction vessel, a premix of 11.7 parts methacrylic acid, 18.7 parts acrylic acid, 23.4 parts methyl methacrylate, 13.3 parts ethyl acrylate, 1.7 parts azobisisobutyronitrile, and 1.7 parts tert-butyl peroctoate was added over 90 minutes to maintain the temperature under 115° C. Once addition was complete, 17.5 parts 2-butoxyethanol and 0.4 parts tert-butyl peroctoate was added and the temperature was held at 110° C. for 50 minutes. At the end of the hold time, an additional 0.2 parts tert-butyl peroctoate was added and the temperature was held for 40 minutes. Once the hold time was complete, the reactor set point was set to 95° C., agitation was increased, and temperature was allowed to drift from 110° C. to 95° C. while 23.5 parts deionized water was added over 10 minutes. At temperature, 14.8 parts dimethyl ethanolamine was added over 5 minutes followed by a 30 minute hold. For the dispersion step, 206.0 parts deionized water was added to the vessel over 50 minutes while the temperature was allowed to drift down and heating was removed. Following the water charge, a second charging of 323.9 parts of deionized water was added over 30 minutes. The heat was reinitiated to a set point of 55° C., at temperature a premix of 68.2 parts methyl methacrylate and 29.2 parts n-butyl acrylate was added over 20 minutes. At temperature, 0.5 parts tert-amyl hydroperoxide (85% in water) and the reaction was held for 5 minutes. Following a brief hold, a premix of 0.3 parts erythorbic acid, 3.1 parts deionized water, 0.3 parts dimethyl ethanolamine, and 0.03 parts of an iron sulfate solution were added over 30 minutes. Following feed, some phase separation was observed, and the system was stirred until homogeneous. The process yielded a material of 31.6% solids, a Brookfield viscosity of 19,500 cps, and a particle size of 0.25 micron.

To prepare a finish coating composition, 10.1 parts 2-butoxyethanol, 50.3 parts amyl alcohol, and 0.4 parts n-butanol were charged to the vessel. The process yielded a material of ~17.8% solids and a #2 Ford Cup viscosity of 60 seconds.

Coating Performance Data

To assess the coating performance properties of the various systems, the coating compositions referenced in the below Tables 1-3 were sprayed applied onto the interior surfaces of standard 12 ounce two-piece aluminum D&I beverage cans at a dry film weight of 115 milligrams per can. The cans were baked for at least 50 seconds at an oven temperature of at least 370° F. (188° C.) to achieve a dome peak metal temperature of at least 390° F. (199° C.). The coated cans were then subjected to the various tests referenced in Tables 1-3.

As can be seen from the data, the coating composition of Example 2 performed similar to the commercial BPA- and styrene-containing inside spray product of Comparative Example B. It also performed similar to the BPA-free, styrene-containing latex of Comparative Example A. The coating composition of Example 2 performed notably better than Example 3, which did not include more than 30 weight percent of monomers A in the emulsion polymerized ethylenically unsaturated monomer component. Thus, as discussed throughout herein, in preferred embodiments the emulsion polymerized ethylenically unsaturated monomer component includes more than 30 weight percent of one or more monomers A.

TABLE 1

| | 3% Acetic Acid - 30' @ 212° F. | | | |
|---|---|---|---|---|
| | Blush | | Adhesion | |
| | Liquid Dome/Side Wall | Vapor Side Wall | Liquid Dome/Side Wall | Vapor Side Wall |
| Example 2 | 9/9 | 10 | 10/10 | 10 |
| Comparative Example A | 10/10 | 10 | 10/10 | 10 |
| Comparative Example B | 10/10 | 10 | 10/10 | 10 |
| Example 3 | 10/10 | 10 | 10/10 | 10 |

TABLE 2

| | 2% Citric Acid - 30' @ 250° F. | | | |
|---|---|---|---|---|
| | Blush | | Adhesion | |
| | Liquid Dome/Side Wall | Vapor Side Wall | Liquid Dome/Side Wall | Vapor Side Wall |
| Example 2 | 6/6 | 10 | 10/10 | 10 |
| Comparative Example A | 8/8 | 10 | 10/10 | 10 |
| Comparative Example B | 7/7 | 10 | 10/10 | 10 |
| Example 3 | 7/5 | 9 | 0/0 | 7 |

TABLE 3

| | Drop Can | |
|---|---|---|
| | Average Final M.E. (mA) | Drop Δ M.E. (mA) |
| Example 2 | 0.8 | 0.3 |
| Comparative Example A | 0.6 | 0.2 |
| Comparative Example B | 0.4 | 0.2 |
| Example 3 | 2.4 | 10.0 |

A BPA-free and styrene-free latex and coating composition similar to that of Example 2 was also made where the water-dispersible polyether-acrylate was made using a preformed organic-solution polymerized acid-functional acrylic instead of an in situ polymerized acrylic as in Example 1. The preformed acrylic and aromatic polyether polymer were reacted together in the presence of a tertiary amine and then dispersed into water. The coating composition exhibited comparable coating performance properties in a food or beverage can coating end use relative to that of Example 2.

The complete disclosure of all patents, patent applications, and publications (including material safety data sheets, technical data sheets and product brochures for the raw materials and ingredients used in the Examples), and electronically available material cited herein are incorporated herein by reference as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A coating composition comprising:
   an aqueous carrier; and
   a resin system dispersed in the aqueous carrier, wherein the resin system is substantially free of styrene and comprises:
   a water-dispersible polymer, and
   an emulsion polymerized ethylenically unsaturated monomer component; and
   a beta-hydroxyalkyl-amide crosslinking agent;
   wherein the coating composition includes 15 to 40 weight percent total solids, based on the total weight of the coating composition, and is an aqueous interior food or beverage container coating composition.

2. The coating composition of claim 1, wherein the coating composition contains at least about 1% by weight and up to about 15% by weight of the beta-hydroxyalkyl-amide crosslinking agent, based on the total resin solids weight of the coating composition.

3. The coating composition of claim 2, wherein the coating composition is substantially free of formaldehyde and formaldehyde-containing materials.

4. The coating composition of claim 1, wherein the coating composition is essentially completely free of formaldehyde and formaldehyde-containing materials.

5. The coating composition of claim 1, wherein the water-dispersible polymer has a number average molecular weight of between about 1,500 and about 50,000.

6. The coating composition of claim 2, wherein the water-dispersible polymer has an acid number of at least about 40 to less than about 400 milligrams KOH per gram of the polymer.

7. The coating composition of claim 2, wherein the water-dispersible polymer comprises an acrylic polymer.

8. The coating composition of claim 7, wherein the acrylic polymer has an acid number of at least about 70 to less than about 200 milligrams KOH per gram of the polymer.

9. The coating composition of claim 2, wherein a cured coating formed from the coating composition has a glass transition temperature greater than 50° C.

10. The coating composition of claim 7, wherein a cured coating formed from the coating composition has a glass transition temperature greater than about 70° C.

11. The coating composition of claim 1, wherein the resin system comprises a reaction product of the ethylenically unsaturated monomer component emulsion polymerized in the presence of an aqueous dispersion of the water-dispersible polymer.

12. The coating composition of claim 1, wherein the water-dispersible polymer has a glass transition temperature of at least 60° C. and a number average molecular weight of at least 2,000.

13. The coating composition of claim 1, wherein the total combined weight of the water-dispersible polymer and the emulsion polymerized ethylenically unsaturated monomer component is at least 50 wt-% of the total resin solids present in the coating composition.

14. The coating composition of claim 1, wherein at least 30 wt-% of the emulsion polymerized ethylenically unsaturated monomer component is selected from one or more alkyl methacrylates, and wherein the ethylenically unsaturated monomer component has a glass transition temperature greater than 50° C.

15. The coating composition of claim 1, wherein the ethylenically unsaturated monomer component comprises 80 to 100 wt-% of alkyl or cycloalkyl (meth)acrylates.

16. The coating composition of claim 1, wherein the unsaturated monomer component comprises at least 40 wt-% of one or more ethylenically unsaturated monomers having a cycloaliphatic group or a linear or branched hydrocarbon group including at least 4 carbon atoms.

17. The coating composition of claim 2, wherein the emulsion polymerized ethylenically unsaturated monomer component includes at least 50 wt-% of one or more of methyl methacrylate, ethyl acrylate, ethyl methacrylate, butyl acrylate, and butyl methacrylate.

18. The coating composition of claim 1, wherein the emulsion polymerized ethylenically unsaturated monomer component includes less than 40 wt-%, if any, of methyl methacrylate and has a glass transition temperature greater than 50° C.

19. The coating composition of claim 1, wherein the emulsion polymerized ethylenically unsaturated monomer component includes at least 80 wt-% of one or more of methyl methacrylate, ethyl acrylate, ethyl methacrylate, butyl acrylate, and butyl methacrylate.

20. The coating composition of claim 1, wherein the emulsion polymerized ethylenically unsaturated monomer component comprises cyclohexyl methacrylate.

21. The coating composition of claim 1, wherein the coating composition has a viscosity of from 20 to 80 seconds (Ford Cup #2, 25° C.) and is an inside spray coating composition for a food or beverage container.

22. The coating composition of claim 21, wherein the coating composition, when spray applied onto an interior of a standard 12 ounce aluminum drawn & ironed beverage can at a dry film weight of 115 milligrams per can and baked for at least 50 seconds at an oven temperature of at least 188° C. to achieve a dome peak metal temperature of at least 199° C., exhibits a lower sidewall adhesion rating value of 9 or 10 after retort in 2% citric acid under pressure at 121° C. and tested according to ASTM D 3359—Test Method B, using SCOTCH 610 tape, available from 3M Company of Saint Paul, Minn.

23. The coating composition of claim 1, wherein the coating composition is substantially free of bisphenols and any structural units derived from a bisphenol.

24. A coating composition comprising:
an aqueous carrier; and
a resin system dispersed in the aqueous carrier, wherein the resin system is substantially free of styrene and comprises:
  a water-dispersible acrylic polymer having an acid number from 40 to 400 milligrams KOH per gram; and
  an emulsion polymerized ethylenically unsaturated monomer component comprising:
    (i) at least 30 wt-% of one or more alkyl (meth) acrylates; and
    (ii) more than 30 wt-% of one or more ethylenically unsaturated monomers having a cycloaliphatic group or a linear or branched hydrocarbon group including at least 4 carbon atoms; and
a beta-hydroxyalkyl-amide crosslinker;
wherein the total combined weight of the water-dispersible polymer and the emulsion polymerized ethylenically unsaturated monomer component is at least 50 wt-% of the total resin solids present in the coating composition; and wherein the coating composition has a viscosity of from 20 to 80 seconds (Ford Cup #2, 25° C.), is substantially free of formaldehyde, and is an aqueous inside spray coating composition for a food or beverage container.

25. The coating composition of claim 24, wherein a cured coating formed from the coating composition has a glass transition temperature greater than 50° C.

26. The coating composition of claim 24, wherein the resin system comprises a reaction product of the ethylenically unsaturated monomer component emulsion polymerized in the presence of an aqueous dispersion of the water-dispersible polymer.

27. The coating composition of claim 26, wherein the emulsion polymerized ethylenically unsaturated monomer component includes at least one alkyl methacrylate, and wherein the emulsion polymerized ethylenically unsaturated component includes one or more C1-C3 alkyl (meth)acrylates.

* * * * *